United States Patent
Wolf et al.

(10) Patent No.: US 8,228,043 B2
(45) Date of Patent: Jul. 24, 2012

(54) LOAD CURRENT DEPENDENT REDUCTION OF CHARGE BATTERY CURRENT

(75) Inventors: Christian Wolf, Neuffen (DE); David Lloyd, Bristol (GB); Anthony Clowes, Swindon (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 12/802,559

(22) Filed: Jun. 9, 2010

(65) Prior Publication Data
US 2010/0244783 A1      Sep. 30, 2010

Related U.S. Application Data

(62) Division of application No. 12/150,977, filed on May 2, 2008, now Pat. No. 7,746,036.

(30) Foreign Application Priority Data

Apr. 29, 2008   (EP) ..................................... 08392005

(51) Int. Cl.
*H02J 7/06*      (2006.01)
*H02J 7/24*      (2006.01)
(52) U.S. Cl. .............................. 320/162; 307/32; 307/66
(58) Field of Classification Search .................. None
See application file for complete search history.

(56) References Cited

U.S. PATENT DOCUMENTS

| | | | | |
|---|---|---|---|---|
| 5,621,299 | A * | 4/1997 | Krall | 320/103 |
| 6,507,172 | B2 | 1/2003 | Sherman | |
| 6,804,091 | B2 * | 10/2004 | Jenkins et al. | 361/18 |
| 6,861,824 | B1 * | 3/2005 | Liu et al. | 320/164 |
| 6,946,817 | B2 | 9/2005 | Fischer et al. | |
| 7,034,503 | B2 | 4/2006 | Veselic et al. | |
| 7,466,042 | B2 * | 12/2008 | Eldredge | 307/154 |
| 7,570,020 | B1 * | 8/2009 | Kranzen et al. | 320/128 |
| 7,710,079 | B2 * | 5/2010 | Martin et al. | 320/164 |
| 2006/0226712 | A1 * | 10/2006 | Eldredge | 307/154 |
| 2006/0244422 | A1 | 11/2006 | DiGiovanna et al. | |
| 2007/0029975 | A1 * | 2/2007 | Martin et al. | 320/134 |
| 2008/0054855 | A1 * | 3/2008 | Hussain et al. | 320/162 |

FOREIGN PATENT DOCUMENTS

| | | |
|---|---|---|
| CA | 2 419 488 | 8/2004 |
| EP | 08392005.8-2207 | 10/2008 |

OTHER PUBLICATIONS

European Search Report, GmbH.

* cited by examiner

*Primary Examiner* — Ramy Ramadan
(74) *Attorney, Agent, or Firm* — Saile Ackerman LLC; Stephen B. Ackerman

(57) ABSTRACT

Circuits and methods to charge batteries of a portable device simultaneously with supplying power to the device for its operation, using a power source with limited maximum current, as e.g. an USB port, have been achieved. The system invented relies upon digital control only. No direct sensing of the current required for the operation of the portable device is required. The control takes care that the sum of the charging current and of the current to run the portable device does not exceed the maximum allowable current of the power source. The current required to run the portable device has precedence over the charging current.

12 Claims, 1 Drawing Sheet

LOAD CURRENT DEPENDENT REDUCTION OF CHARGE BATTERY CURRENT

This is a divisional application of U.S. patent application Ser. No. 12/150,977 filed on May 2, 2008 now U.S. Pat. No. 7,746,036, which is herein incorporated by reference in its entirety, and assigned to a common assignee.

BACKGROUND OF THE INVENTION (1) Field of the Invention

This invention relates generally to battery driven mobile devices and relates more specifically to charging these mobile electronic devices from power supplies providing only limited current as e.g. universal serial bus (USB) port.

(2) Description of the Prior Art

Battery driven portable electronic devices such as cellular telephones, personal digital assistants (PDAs), etc. are becoming very popular.

The batteries of the mobile have to be recharged periodically by an external power source, using a battery charger, usually receiving power from a standard AC electrical outlet and converting the power into a low DC voltage.

The charging of the batteries is often controlled by a battery charge controller to manage the charging of the battery. It is a challenge for the designers of battery charge controllers when they are confronted with power supplies such as e.g. universal serial bus (USB) port having a limited capacity only and if the power from such a supply is not only used for the charging of the batteries but also simultaneously for the operation of the portable device.

The majority of personal computers (PCs) and laptop computers available today are provided with one or more USB ports as standard components. Besides data communication USB ports can supply power to a connected device in a limited extent. So called high-power USB ports can supply a maximum current of at least 500 mA and low-power USB ports can supply a current of usually 100 mA. Problems arise if the portable device consumes at least temporarily most of the power delivered by an USB port, or by another source having limited current capacity, for its own operation and simultaneously the batteries need power for recharging. An over current situation of such a power supply has to be avoided in any case.

There are known patents or patent publications dealing with the charging batteries of portable devices via USB ports or the like:

U.S. Patent (U.S. Pat. No. 7,034,503 to Veselic et al.) proposes an integral power node of a computer data bus, such as a USB (universal serial bus) port for a convenient source of charging power for portable communication devices. Unfortunately, USB ports have limited power capacity, making them generally incompatible with battery charge controllers (BCCs) which are designed to receive a steady, high capacity input. The invention provides a battery charging circuit, which adjusts to the parameters of an external power supply such as a USB port by adding a regulating circuit to a standard BCC design. This regulating circuit maximizes the current drawn by the BCC, while keeping the voltage to the BCC above a preset minimum (the low voltage shut off level for the BCC). If the voltage to the BCC begins to drop, the regulating circuit reduces the current drawn, so the voltage rises and stays within the operating range of the BCC.

U.S. Patent (U.S. Pat. No. 6,946,817 to Fischer et al.) discloses a system for powering and charging a mobile communication device includes a processing device, a rechargeable battery, a Universal Serial Bus (USB) interface, and a charging subsystem. The rechargeable battery is configured to supply power to the processing device. The USB interface is configured to connect to a USB port via a USB cable. The charging subsystem is coupled to the USB interface, and is configured to charge the rechargeable battery using power received from the USB interface.

U.S. Patent application publication (US 2006/0244422 to DiGiovanna et al.) discloses methods and apparatus for charging a power source comprising determining a type of power supply used by a base, communicating a charge rate to a power source charging module and providing power to the power source at a charge rate. In one embodiment, a scanner can recharge from a cradle that receives power from either a dedicated external power source or through USB by adjusting its charge rate based on a communication from the base.

Furthermore U.S. Patent (U.S. Pat. No. 6,507,172 to Sherman) discloses an universal serial bus powered battery charger primarily intended for use in battery powered handheld and other portable devices to charge the battery or batteries within the battery powered device when the same is connected to a host device, powered hub or a bus powered hub through a universal serial bus (USB) port. The battery charger includes one or more current limits to conform to the universal serial bus current supply limit set in the USB specification. Any of the universal serial bus voltage and current limits may be used to charge batteries in the battery-powered device, such as single cell lithium-ion batteries.

SUMMARY OF THE INVENTION

A principal object of the present invention is to achieve methods and systems to charge batteries of portable devices simultaneously with supplying power to these devices for their operations from a power supply having limited current capacity.

A further object of the present invention is to achieve a fully digital control of the systems invented.

A further object of the present invention is to avoid exceeding the allowable current limit of the power source used.

Another object of the present invention is to have precedence of the current required to run the portable device over a charging current.

In accordance with the objects of this invention a method to charge batteries of portable devices simultaneously with supplying power to these devices for their operations has been achieved. The method invented comprises, first, step 1: providing a DC power source, a supply regulator, one or more rechargeable batteries, a battery charger controlled by a digital control unit, a voltage comparator, and a capacitor, step 2: setting charge current to charge batteries to a predefined default current level, and step 3: delaying process flow for a defined time interval. The following steps include step 4: checking if voltage at inputs of said portable device and of said battery charger is lower than a defined threshold voltage, and, if positive, go to step (5) else go to step (7), step 5: checking, if said charge current is zero, and if positive, go to step (3) else go to step (6), and step 6: decreasing said charge current and go then to step (3). The last steps comprise step 7: checking if said charge current is smaller than said predefined default current level, and if positive, go to step (8), else go to step (3), and step 8: increasing said charge current and go then to step (3).

In accordance with the objects of this invention a system to charge batteries of a portable device simultaneously with supplying power to the device for its operation has been achieved. The system invented comprises, first, a rechargeable battery, a DC power source connected at its output to a supply regulator, and said supply regulator regulating its output voltage and limiting its output current just below the maximum allowable output current of said DC power supply, wherein the output of the supply regulator is supplying the operation of the portable device and its voltage corresponds to the supply voltage level required the portable device, and the output is further connected to the power input of a battery charger, charging said rechargeable battery, to a first terminal of a capacitor, and to a first input of a voltage comparator. Furthermore the system comprises said capacitor having its second terminal connected to ground, said battery charger, charging with its output said rechargeable battery, having its operation controlled by a digital controller, said digital controller wherein an input is connected to an output of said voltage comparator, and said voltage comparator having a reference voltage as a second input comparing said reference voltage with the output voltage of said supply regulator.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose methods and systems to charge batteries of portable devices simultaneously with supplying power to these devices for their operations from a power supply having limited current capacity as e.g. universal serial bus (USB) port. It is to be understood that the present invention can support more than one separated portable devices each having their own battery charge system.

An USB port provides usually either 100 mA or 500 mA, wherein USB ports having even higher currents than 500 mA are available today. In case the sum of the charge current and the system current, i.e. the current required for the operation of the portable device, exceeds the current capacity of the power supply, the output voltage to the portable device starts to drop and the operation of the portable device is in jeopardy.

The preferred embodiments of the present invention measure the system current and adjust (e.g. decrease) the charge current in a way that the sum of the two currents does not exceed the maximum allowable current from the power supply. This approach gives priority to the system current over the charging current.

Figure 1:
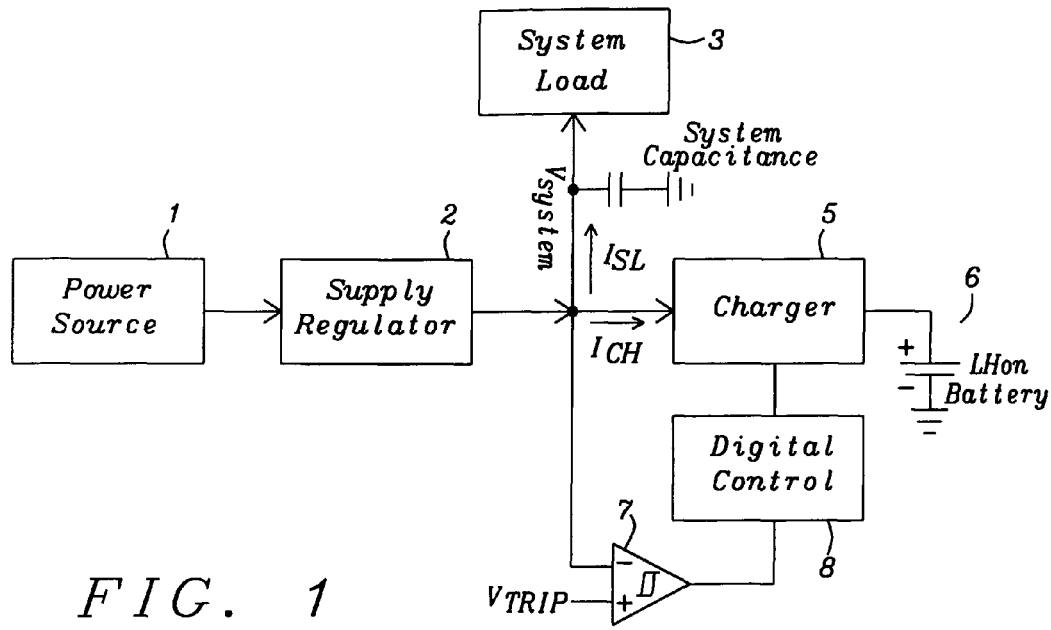
FIG. 1 shows a schematic block diagram of a preferred embodiment of the present invention.

FIG. 1 shows a schematic block diagram of a preferred embodiment of the present invention. The system voltage node $V_{SYSTEM}$, i.e. the voltage to supply the operation of the portable device, is controlled by a supply regulator 2; this can be e.g. a linear regulator (LDO) with a current limit or a switched regulator with current limit (buck, boost, buckboost type). The voltage level of $V_{SYSTEM}$ is defined by the voltage level required for the operation of the portable device. This supply regulator 2 incorporates a current limiting circuitry having a current limit just below the maximum current of the current source 1, in a preferred embodiment an USB bus. It should be understood that the present invention is applicable to any other power supply having a maximum current limit close to the current demand to charge and run the portable device simultaneously, e.g. a Firewire/IEEE1394 port, or a current limited wall brick). In a preferred embodiment all components 2-8, with the exception of the power source 1, of the present invention are integrated in the portable device, which is supported by the system invented. It is obvious that the present invention would be applicable for embodiments wherein all or some of the components would not be integrated into a device.

Furthermore there must be a system capacitance 4 present on the $V_{SYSTEM}$ node for filtering and decoupling. For the capacitance required either an already existing capacitance of the system is (re-) used or a new capacitor 4 is added. This system capacitance 4 establishes the relation between current and voltage, as the present invention acts on currents as setting the current level for $I_{CH}$ but reacts on voltage as the comparator 7, comparing $V_{SYSTEM}$ with $V_{trip}$. The system node at the capacitor establishes a summing point between incoming current (from the regulator) and outgoing current ($I_{CH}$ and $I_{SYSTEM}$).

Current is delivered from the node $V_{SYSTEM}$ to the system load 3, i.e. the load of the operation of the portable device, and via charger 5 to the battery 6 of the portable device when charging is performed. Usually Li-ion batteries are used for such applications. The battery might or might not be removable.

When the sum of the system load current $I_{SL}$ and of the charging current $I_{CH}$ exceeds the current limit of the supply regulator 2, the voltage at the $V_{SYSTEM}$ node starts to drop below its nominal voltage level because there is less current (it's limited) flowing into the capacitance than is drawn out of the capacitance by $I_{CH}$ and $I_{SYSTEM}$. At a defined threshold voltage $V_{TRIP}$, which is below the nominal voltage level of $V_{SYSTEM}$ node, the comparator 8, comparing voltage level $V_{SYSTEM}$ with the threshold voltage $V_{TRIP}$, indicates the voltage drop of $V_{SYSTEM}$ node voltage to the digital control 8 of the charger 5. After receiving the indication of a voltage drop of voltage $V_{SYSTEM}$ below threshold voltage $V_{TRIP}$, the digital control unit, controlling charger 5, decreases the charge current $I_{CH}$ until voltage $V_{SYSTEM}$ comes back until a voltage level above threshold voltage $V_{TRIP}$ is reached. After the comparator 7 indicates to the digital control unit 8 that $V_{SYSTEM}$ voltage is higher than threshold voltage $V_{TRIP}$, the digital control unit 8 is increasing charge current $I_{CH}$ via charger 5 until the current limit of the supply regulator 2 is reached and $V_{SYSTEM}$ run voltage falls again.

The periodic decrease/increase of the charge current $I_{CH}$ results in $V_{SYSTEM}$ voltage settling around the comparator threshold voltage $V_{TRIP}$ as long as the system current $I_{SL}$ does not exceed the current limit set on supply regulator 2. In this case the charge current $I_{CH}$ is already reduced to zero and inevitably drops further. The intention of the present invention is that the system load current $I_{SL}$ gets precedence over the charge current $I_{CH}$.

Figure 2:
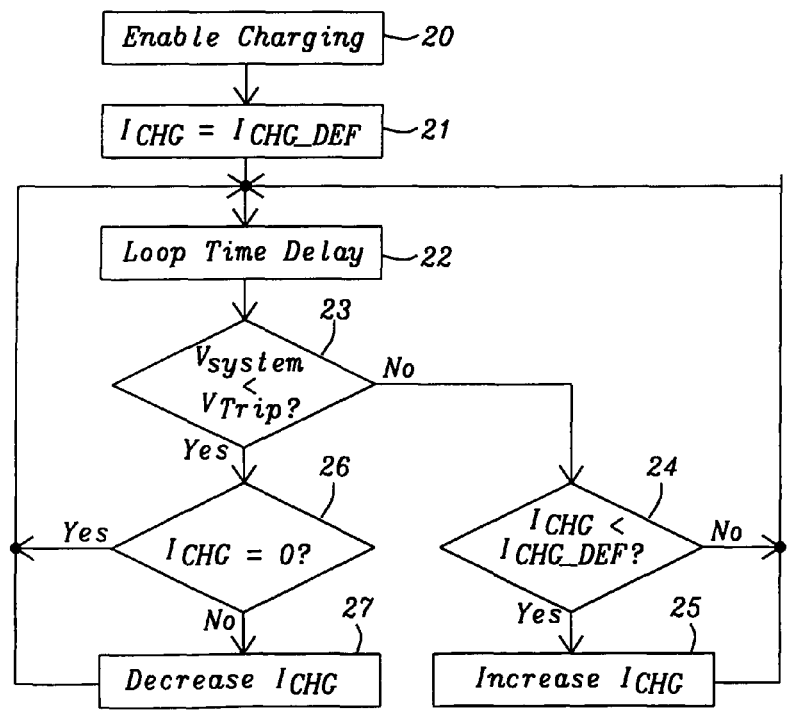
FIG. 2 illustrates a flowchart of the method invented to charge batteries of portable devices simultaneously with supplying power to these devices for their operations from a power supply having limited current capacity.

FIG. 2 illustrates a flowchart of the method invented to charge batteries of portable devices simultaneously with supplying power to these devices for their operations from a power supply having limited current capacity.

Step 20 of FIG. 2 illustrates the start procedure, i.e. enabling the charging. In the following step 21 the charging current $I_{CH}$ is set by digital control unit 8 to a defined default level $I_{CH\_DEF}$. The defined default level $I_{CH\_DEF}$ could be any current not exceeding the maximum allowable charge current. The following step 22 comprises a time delay to stabilize the regulation of the charge current. Without time delay the charge current would be increased/decreased in one rush all the way up/down. By the delay this step-up/down behavior is controlled. Therefore the voltage at $V_{SYSTEM}$ settles smoothly in the equilibrium state, i.e. the incoming current corresponds to the outgoing current at sum node. The delay can be in the order of magnitude of between 1 us and couple 100 us. The delay is incorporated in the digital control and stabilizes the system.

Step 23 describes a check if the voltage level $V_{SYSTEM}$ is smaller than threshold voltage $V_{TRIP}$. In a preferred embodiment this check is performed by comparator 23, wherein the comparator produces an digital output. Furthermore it should be noted that in a preferred embodiment all steps are performed digitally except the voltage comparison of step 23.

In case $V_{SYSTEM}$ is equal to or higher than $V_{TRIP}$ the process flow goes to step 24. In a preferred embodiment the value of $V_{TRIP}$ is slightly lower than an nominal level of $V_{SYSTEM}$.

Step 24 describes another check, namely if the actual charge current $I_{CH}$ is smaller than the defined default charge current $I_{CH\_DEF}$. In case of the actual charge current $I_{CH}$ being smaller than the default charge current $I_{CH\_DEF}$, the process flow goes to step 25, wherein the actual charge current $I_{CH}$ is increased. In a preferred embodiment this increase is controlled by digital control unit 8. Then the process flow goes back to step 22.

In case the result of the check of step 24 is that $I_{CH}$ is not smaller than the default charge current $I_{CH\_DEF}$, the process flow goes direct back to step 22. In a preferred embodiment the comparison between $I_{CH}$ and $I_{CH\_DEF}$ is performed digitally. These are digital control settings (vectors) for the charge current. In case the check of step 23 results in $V_{SYSTEM}$ being smaller than $V_{TRIP}$ the process flow goes to step 26.

Step 26 describes another check, namely if the actual charge current $I_{CH}$ is zero. In case of the actual charge current $I_{CH}$ being not zero, the process flow goes to step 27, wherein the actual charge current $I_{CH}$ is decreased. In a preferred embodiment this decrease is controlled by digital control unit 8. Then the process flow goes back to step 22.

Summarizing the present invention it should be noted that important points of the invention are that an indirect measurement of the system load current is performed using a comparator and capacitor 4.

Therefore no direct sensing of the system load current $I_{SL}$ is required. Furthermore it should be noted that all control of the system invented is performed digitally by digital control unit 8.

While the invention has been particularly shown and described with reference to the preferred embodiments thereof, it will be understood by those skilled in the art that various changes in form and details may be made without departing from the spirit and scope of the invention.

What is claimed is:

1. A system to charge batteries of a portable device simultaneously with supplying power to the device for its operation is comprising:
   a rechargeable battery,
   a DC power source connected at its output to a supply regulator;
   said supply regulator regulating its output voltage and limiting its output current just below the maximum allowable output current of said DC power supply, wherein the output of the supply regulator is supplying the operation of the portable device and its voltage corresponds to the supply voltage level required by the portable device, and the output of the supply regulator is further connected to the power input of a battery charger, charging said rechargeable battery, to a first terminal of a capacitor, and to a first input of a voltage comparator
   said capacitor having its second terminal connected to ground;
   said battery charger, charging with its output said rechargeable battery, having its operation controlled by a digital controller, wherein the battery is charged or discharged depending upon the output of the voltage comparator in order to reduce or increase a charge current depending upon a load current required by the portable device;
   said digital controller wherein its input is connected to an output of said voltage comparator and its output is connected to said battery charger, wherein a time delay is implemented after any change of the charge current; and
   said voltage comparator having a reference voltage as a second input comparing said reference voltage with the output voltage of said supply regulator, wherein the value of the reference voltage is slightly lower than a nominal level of the output voltage of the supply regulator, wherein an indirect measurement of a current required by the portable device is performed using said voltage comparator and said capacitor and wherein, if the output voltage of the supply regulator is below the reference voltage, the digital controller decreases the charge current until the output voltage of the supply regulator comes back until a voltage level above the reference voltage is reached.

2. The system of claim 1 wherein said DC power source has a maximum allowable current limit.

3. The system of claim 2 wherein said DC power source is a universal serial bus (USB) port.

4. The system of claim 2 wherein said DC power source is a Firewire/IEEE1394 port.

5. The system of claim 2 wherein said DC power source is a current limited wall brick.

6. The system of claim 1 wherein said supply regulator, one or more rechargeable batteries, the battery charger, the digital control unit, the capacitor, and the voltage comparator are integrated in said portable device.

7. The system of claim 1 wherein a system capacitance replaces said capacitor.

8. The system of claim 1 wherein said supply regulator allows a maximum output current, which is slightly lower than said maximum allowable current limit of said DC power source.

9. The system of claim 1 wherein said supply regulator is a linear regulator.

10. The system of claim 1 wherein said supply regulator is a switched regulator.

11. The system of claim 1 wherein more than one rechargeable battery is deployed.

12. The system of claim 1 wherein said digital control controls the battery charger in a way that the current required for the operation of the portable device has precedence over the charging current of the batteries.

* * * * *